United States Patent
Shinbara et al.

(10) Patent No.: US 12,128,654 B2
(45) Date of Patent: Oct. 29, 2024

(54) COSMETIC SHEET AND COSMETIC PLATE (71) Applicant: Dai Nippon Printing Co., Ltd., Tokyo (JP)

(72) Inventors: Yuuhei Shinbara, Tokyo (JP); Toshinaru Kayahara, Tokyo (JP); Tomoyuki Hamaguchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 96 days.

(21) Appl. No.: 16/329,847

(22) PCT Filed: Sep. 15, 2017

(86) PCT No.: PCT/JP2017/033559
§ 371 (c)(1),
(2) Date: Mar. 1, 2019

(87) PCT Pub. No.: WO2018/052138
PCT Pub. Date: Mar. 22, 2018

(65) Prior Publication Data
US 2019/0184688 A1 Jun. 20, 2019

(30) Foreign Application Priority Data
Sep. 16, 2016 (JP) ................ 2016-181266

(51) Int. Cl.
*B32B 27/20* (2006.01)
*B32B 3/30* (2006.01)
(Continued)

(52) U.S. Cl.
CPC ............ *B32B 27/20* (2013.01); *B32B 3/30* (2013.01); *B32B 7/12* (2013.01); *B32B 27/00* (2013.01);
(Continued)

(58) Field of Classification Search
CPC ...... C09D 5/16; C09D 5/1687; C09D 5/1681; C09D 5/0606; B32B 27/20; B32B 27/00;
(Continued)

(56) References Cited

U.S. PATENT DOCUMENTS 7,169,457 B2 1/2007 Suto et al.
8,038,830 B2 10/2011 Suto et al.
(Continued)

FOREIGN PATENT DOCUMENTS

CN 102926520 A 2/2013
CN 104903102 A 9/2015
(Continued)

OTHER PUBLICATIONS

Translation to English for WO 2015-1051685 A1 via espacenet. accessed Jan. 12, 2021. (Year: 2015).*

(Continued)

*Primary Examiner* — Nancy R Johnson
(74) *Attorney, Agent, or Firm* — Locke Lord LLP; James E. Armstrong, IV; Nicholas J. DiCeglie, Jr.

(57) ABSTRACT

The present invention provides a low-gloss decorative sheet having an appropriately low level of wiping resistance, and thereby enables strongly adhering grime to be easily wiped off, thus being excellent in terms of easy cleanability. The present invention provides a decorative sheet comprising a base material sheet and at least a surface-protecting layer on the base material sheet, (1) the base material sheet being a thermoplastic resin sheet,
(2) the surface-protecting layer having a surface free energy of 40 mJ/m² or more,
(3) an arithmetic average roughness (Ra0.08) measured on the surface side of the surface-protecting layer at a cutoff value of 0.08 mm with an evaluation length of
(Continued)

0.4 mm by a measurement method in accordance with JIS B0601:2001 being 0.60 μm or less, and (4) a specular glossiness on the surface-protecting layer side of the decorative sheet at an incident angle of 60° being 23 or less.

13 Claims, 2 Drawing Sheets

(51) Int. Cl.
| | | |
|---|---|---|
| B32B 7/12 | (2006.01) | |
| B32B 27/00 | (2006.01) | |
| B32B 27/08 | (2006.01) | |
| B32B 27/32 | (2006.01) | |
| B32B 27/40 | (2006.01) | |
| B32B 37/24 | (2006.01) | |
| B32B 38/00 | (2006.01) | |
| B32B 38/06 | (2006.01) | |
| B44C 1/24 | (2006.01) | |
| B44C 5/04 | (2006.01) | |
| B44F 1/02 | (2006.01) | |

(52) U.S. Cl.
CPC ............. *B32B 27/08* (2013.01); *B32B 27/32* (2013.01); *B32B 27/40* (2013.01); *B44C 1/24* (2013.01); *B44C 5/04* (2013.01); *B44F 1/02* (2013.01); *B32B 37/24* (2013.01); *B32B 2037/243* (2013.01); *B32B 38/0008* (2013.01); *B32B 2038/0076* (2013.01); *B32B 38/06* (2013.01); *B32B 2307/408* (2013.01); *B32B 2307/412* (2013.01); *B32B 2307/538* (2013.01); *B32B 2307/584* (2013.01); *B32B 2310/0887* (2013.01); *B32B 2310/14* (2013.01); *B32B 2323/10* (2013.01); *B32B 2375/00* (2013.01); *B32B 2451/00* (2013.01)

(58) Field of Classification Search
CPC .... B32B 7/02; B32B 3/30; B32B 7/12; B32B 27/08; B32B 27/32; B32B 27/40; B32B 37/24; B32B 38/0008; B32B 38/06; B32B 2037/243; B32B 2038/0076; B32B 2307/408; B32B 2307/412; B32B 2307/538; B32B 2307/584; B32B 2310/0887; B32B 2310/14; B32B 2323/10; B32B 2375/00; B32B 2451/00; B32B 2307/4026; B32B 2264/12; B32B 2307/4023; B32B 2250/02; B32B 2250/03; B32B 2307/75; B32B 2264/102; B32B 2307/406; B32B 2255/08; B32B 21/08; B32B 2255/28; B32B 2255/10; B32B 2255/26; B32B 27/16; B32B 7/022; B32B 7/023; B32B 2307/73; B44C 5/04; B44C 1/24; B44F 1/02; C08J 7/046; C08J 2475/14; C08J 2323/12; C08J 7/042
USPC .......................................................... 428/143
See application file for complete search history.

(56) References Cited

U.S. PATENT DOCUMENTS

| | | | |
|---|---|---|---|
| 8,137,789 | B2 | 3/2012 | Suto et al. |
| 10,457,025 | B2 | 10/2019 | Iriyama et al. |
| 2004/0062913 | A1 | 4/2004 | Suto et al. |
| 2005/0260414 | A1* | 11/2005 | MacQueen .......... C09D 133/16 428/421 |
| 2006/0130421 | A1* | 6/2006 | Nollet ...................... B44C 5/04 52/582.1 |
| 2007/0009711 | A1 | 1/2007 | Suto et al. |
| 2007/0126144 | A1* | 6/2007 | Jin .......................... B29C 48/92 264/210.2 |
| 2008/0305300 | A1 | 12/2008 | Suto et al. |
| 2010/0101722 | A1 | 4/2010 | Suto et al. |
| 2010/0273019 | A1 | 10/2010 | Kitaike et al. |
| 2018/0043669 | A1* | 2/2018 | Iriyama ................. B32B 27/20 |
| 2018/0186131 | A1* | 7/2018 | Kudo ..................... B32B 27/32 |
| 2018/0186132 | A1* | 7/2018 | Ikeda ..................... B32B 27/10 |
| 2018/0297336 | A1* | 10/2018 | Fascella ................. E04F 13/18 |

FOREIGN PATENT DOCUMENTS

| | | | |
|---|---|---|---|
| CN | 105377521 | A | 3/2016 |
| EP | 0825020 | A2 | 2/1998 |
| JP | 61-148049 | A | 7/1986 |
| JP | 06-055900 | A | 3/1994 |
| JP | 2002-113805 | A | 4/2002 |
| JP | 2004-115972 | A | 4/2004 |
| JP | 2009-255490 | A | 11/2009 |
| JP | 2013-031995 | A | 2/2013 |
| JP | 2014-069507 | A | 4/2014 |
| JP | 2015-202598 | A | 11/2015 |
| JP | 2015-205505 | A | 11/2015 |
| JP | 2016-117280 | A | 6/2016 |
| JP | 2016-165807 | A | 9/2016 |
| WO | 2014/184418 | A1 | 11/2014 |
| WO | WO-2015105168 | A1 * | 7/2015 ............. B32B 27/32 |
| WO | 2016/047780 | A1 | 3/2016 |

OTHER PUBLICATIONS

International Search Report mailed Nov. 21, 2017, issued for PCT/JP2017/033559.

Extended Supplementary Search Report issued in corresponding European Patent Application No. EP 17851035.0, dated Mar. 4, 2020.

Office Action issued in corresponding Korean Patent Application No. KR 10-2019-7010775, dated Aug. 7, 2020.

Office Action issued in corresponding Chinese Patent Application No. CN 201780056888.2, dated Jun. 28, 2020.

* cited by examiner

COSMETIC SHEET AND COSMETIC PLATE

TECHNICAL FIELD

The present invention relates to a decorative sheet and a decorative plate.

BACKGROUND ART

Conventionally, decorative sheets are laminated on the surface of various articles in order to impart designability. For example, wall-covering materials, which are used on wall surfaces of buildings, and floor decorative materials, which are used on floor surfaces, are used with decorative sheets laminated on the surface.

Current decorative sheets have a problem in that grime stuck on them during housing construction is difficult to remove for cleaning after housing construction and before handover of the property. In particular, gypsum powder, which accounts for most grime that is difficult to remove, is white and thus noticeable and is composed of small particles (fine particles). Therefore, gypsum powder is considered to be a contaminant difficult to clean off.

In particular, decorative sheets for floors have a problem in that the surface of the decorative sheets to which a contaminant adheres is sometimes stepped on by a pedestrian with slippers or the like, and the contaminant strongly adheres to the surface of the decorative sheets, which makes cleaning difficult.

As prior art, there is disclosed a decorative sheet that prevents reduction in easy cleanability (property of being easily cleaned), which is achieved by specifying surface irregularities of the decorative sheet so that the contaminants as described above do not easily enter recesses (Patent Literature (PTL) 1).

CITATION LIST

Patent Literature

PTL 1: JP2014-069507A

SUMMARY OF INVENTION

Technical Problem

Although the contaminants can be removed from the decorative sheets as described above, ease of wiping when removing grime (wiping resistance) has not been taken into consideration. If a decorative sheet exhibits high resistance in wiping, a snagging feeling occurs, and removing grime is difficult.

Further, easy cleanability of the decorative sheets when used for floors is not taken into consideration. Specifically, easy cleanability when the surface of a decorative sheet to which a contaminant adheres is stepped on by a pedestrian with slippers or the like, and the contaminant strongly adheres to the surface of the decorative sheet is not discussed. Sufficiently wiping grime off is difficult.

Moreover, decorative sheets require designability. If surface irregularities are reduced in view of easy cleanability, gloss on the surface appears, and low-gloss designability cannot be expressed.

An object of the present invention is to provide a decorative sheet that has an appropriately low level of wiping resistance and that thereby enables strongly adhering grime to be easily wiped off, thus being excellent in terms of easy cleanability. The decorative sheet also ensures a low-gloss feeling, thus having excellent designability.

Solution to Problem

The inventors of the present invention conducted extensive research and found that the above object can be achieved by setting the surface free energy of the surface-protecting layer within a specific range, shaping the surface of the surface-protecting layer into a specific uneven shape, and setting the specular glossiness of the surface-protecting layer side of the decorative sheet at an incident angle of 60° within a specific range. The present invention was completed based on such a finding.

More specifically, the present invention provides the following decorative sheets and decorative plate.

1. A decorative sheet comprising a base material sheet and at least a surface-protecting layer on the base material sheet,
   (1) the base material sheet being a thermoplastic resin sheet,
   (2) the surface-protecting layer having a surface free energy of 40 $mJ/m^2$ or more,
   (3) an arithmetic average roughness (Ra0.08) measured on the surface side of the surface-protecting layer at a cutoff value of 0.08 mm with an evaluation length of 0.4 mm by a measurement method in accordance with JIS B0601:2001 being 0.60 μm or less, and
   (4) a specular glossiness on the surface-protecting layer side of the decorative sheet at an incident angle of 60° being 23 or less.

2. The decorative sheet according to item 1, wherein the arithmetic average roughness (Ra0.08) measured on the surface side of the surface-protecting layer at a cutoff value of 0.08 mm with an evaluation length of 0.4 mm by a measurement method in accordance with JIS B0601:2001 is 0.50 μm or more.

3. The decorative sheet according to item 1 or 2, wherein the surface free energy on the surface side of the surface-protecting layer is 54 $mJ/m^2$ or less.

4. The decorative sheet according to any one of items 1 to 3, wherein the specular glossiness on the surface-protecting layer side of the decorative sheet at an incident angle of 60° is 14 or less.

5. The decorative sheet according to any one of items 1 to 4, wherein the surface-protecting layer comprises an inorganic filler.

6. The decorative sheet according to item 5, wherein the inorganic filler is in a form of vesicle formed by a supercritical reverse phase evaporation method.

7. The decorative sheet according to item 5 or 6, wherein the inorganic filler is a hydrophobic inorganic filler.

8. The decorative sheet according to item 7, wherein the hydrophobic inorganic filler has a particle size of 1 μm or more and 10 μm or less in terms of mode diameter.

9. The decorative sheet according to item 7 or 8, wherein the hydrophobic inorganic filler content is 0.5 parts by mass or more and 30 parts by mass or less, based on 100 parts by mass of resins that constitute the surface-protecting layer.

10. The decorative sheet according to any one of items 7 to 9, wherein the hydrophobic inorganic filler is hydrophobic silica.

11. The decorative sheet according to any one of items 1 to 10, wherein the resins that constitute the surface-protecting layer comprise an ionizing radiation-curable resin.

12. A decorative plate having the decorative sheet according to any one of items 1 to 11 on an adherend.

Advantageous Effects of Invention

The decorative sheet according to the present invention has an appropriately low level of wiping resistance, and thus grime strongly adhering during housing construction or the like can be easily wiped off. Therefore, the decorative sheet of the present invention is excellent in terms of easy cleanability, and ensures a low-gloss feeling and excellent designability. Thus, the decorative sheet of the present invention can be suitably used, in particular, as a decorative sheet for floors.

DESCRIPTION OF EMBODIMENTS

1. Decorative Sheet of the Present Invention

The decorative sheet of the present invention comprises a base material sheet and at least a surface-protecting layer on the base material sheet, (1) the base material sheet being a thermoplastic resin sheet, (2) the surface-protecting layer having a surface free energy of 40 mJ/m$^2$ or more, (3) the arithmetic average roughness (Ra0.08) measured on the surface side of the surface-protecting layer at a cutoff value of 0.08 mm with an evaluation length of 0.4 mm by a measurement method in accordance with JIS B0601:2001 being 0.60 µm or less, and (4) the specular glossiness on the surface-protecting layer side of the decorative sheet at an incident angle of 60° being 23 or less. The decorative sheet having the above characteristics has an appropriately low level of wiping resistance, and thereby enables strongly adhering grime, such as grime (in particular, gypsum powder, which accounts for most grime and is difficult to remove) that adheres during housing construction or the like, to be easily wiped off. Therefore, the decorative sheet is excellent in terms of easy cleanability, and ensures a low-gloss feeling and excellent designability. In other words, the decorative sheet of the present invention is excellent in terms of easy cleanability for various types of grime. Therefore, the decorative sheet of the present invention can be suitably used for floors.

The decorative sheet of the present invention is explained in detail below. In the decorative sheet of the present invention, the surface refers to a "front surface." When the decorative sheet of the present invention is laminated on an adherend or the like, the "front surface" is opposite to a surface that comes in contact with the adherend. The front surface is perceptible to the eye after lamination. Further, in this specification, the above surface side of the decorative sheet may also be referred to as "the front" or "above," and the opposite side may also be referred to as "the back" or "below."

Figure 1:
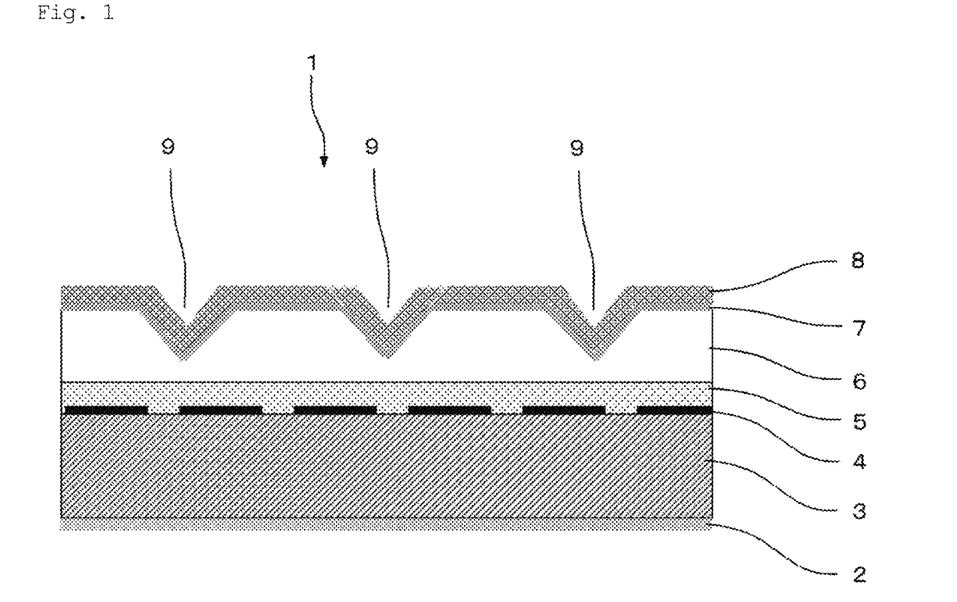
FIG. 1 is a cross-sectional view illustrating an example of the decorative sheet of the present invention.
Figure 2:
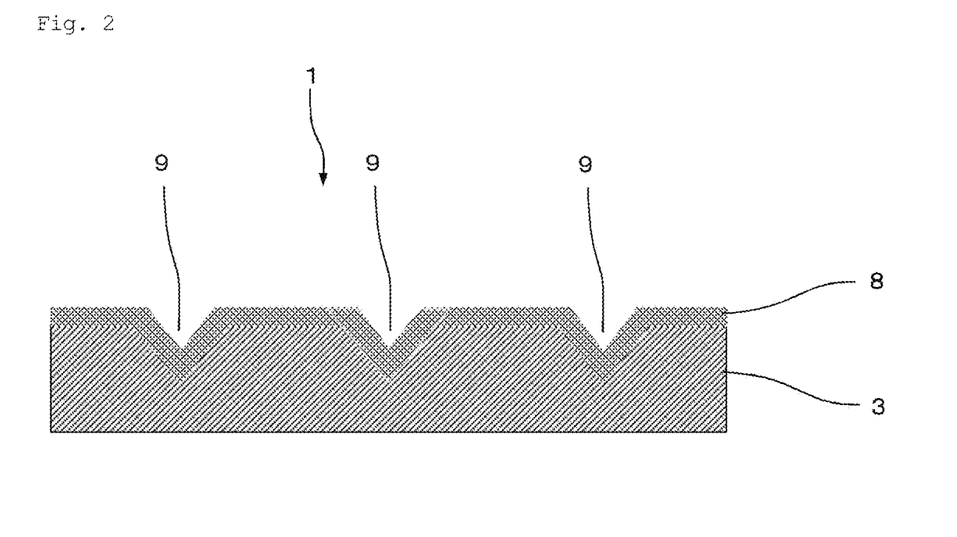
FIG. 2 is a cross-sectional view illustrating an example of the decorative sheet of the present invention.

The specific structure (layer structure) of the decorative sheet is not limited as long as the decorative sheet of the present invention satisfies the requirement that the decorative sheet comprises a base material sheet and at least a surface-protecting layer on the base material sheet, that (1) the base material sheet is a thermoplastic resin sheet, that (2) the surface-protecting layer has a surface free energy of 40 mJ/m$^2$ or more, that (3) the arithmetic average roughness (Ra0.08) measured on the surface side of the surface-protecting layer at a cutoff value of 0.08 mm with an evaluation length of 0.4 mm by a measurement method in accordance with JIS B0601:2001 is 0.60 µm or less, and that (4) the specular glossiness on the surface-protecting layer side of the decorative sheet at an incident angle of 60° is 23 or less. The decorative sheet of the present invention may be, for example, as shown in FIG. 1, a sheet formed by laminating a picture pattern layer 4, an adhesive layer 5, a transparent resin layer 6, a primer layer 7, and a surface-protecting layer 8 in this order on a base material sheet 3; and providing a back-surface primer layer 2 on the back surface of the base material 3, and embossing the uppermost surface side. Each of the layers is described below in detail using the decorative sheet having this layer structure as a representative example; however, as shown in FIG. 2, the decorative sheet of the present invention may be a sheet formed by laminating a surface-protecting layer 8 on a base material sheet 3, and embossing the uppermost surface side. In the following description of each layer, reference symbols are omitted. The thickness of the layer referred to herein is a thickness as measured in a portion where the decorative sheet has no unevenness, such as a portion that is not embossed.

Base Material Sheet

The decorative sheet of the present invention comprises a base material sheet.

The base material sheet is a layer on the surface (front surface) of which a picture pattern layer and the like are sequentially laminated. As the base material sheet, a sheet (film) formed of a thermoplastic resin is used. Specific examples include polyethylene, ethylene-a olefin copolymers, polypropylene, polymethylpentene, polybutene, ethylene-propylene copolymers, propylene-butene copolymers, ethylene-vinyl acetate copolymers, saponified products of ethylene-vinyl acetate copolymers, ethylene-(meth)acrylic acid copolymers, ethylene-(meth)acrylic acid ester copolymers, and like olefin-based resins, polyvinyl chloride, polyethylene terephthalate, polybutylene terephthalate, polyamide, polycarbonate, polyethylene naphthalate, ionomers, acrylic acid ester-based polymers, methacrylic acid ester-based polymers, and the like. The base material sheet is formed by using these resins singly or in a combination of two or more. The term "(meth)acrylic acid" refers to acrylic acid and/or methacrylic acid; the same applies to other portions referring to "meth."

The base material sheet may be colored. In this case, the base material sheet can be colored by adding a colorant (pigment or dye) to such a thermoplastic resin as mentioned above. Examples of colorants include inorganic pigments, such as titanium dioxide, carbon black, and iron oxide; organic pigments, such as phthalocyanine blue; and various dyes. One or more such colorants may be selected from known or commercially available products. Further, the colorant amount may be determined according to, for example, the desired color.

The base material sheet may contain various additives, such as fillers, matting agents, foaming agents, flame retardants, lubricants, antistatic agents, antioxidants, ultraviolet absorbers, and light stabilizers, as required.

The thickness of the base material sheet is suitably determined depending on the application of the final product, the method of use of the final product, etc. In general, the thickness of the base material is preferably 20 to 300 µm.

The surface (front surface) of the base material sheet may be subjected to a corona discharge treatment, if necessary, in order to increase the adhesion of the ink that forms the picture pattern layer etc. Methods and conditions for the corona discharge treatment may be determined according to known methods. Further, if necessary, a corona discharge treatment may be performed on the back surface of the base material sheet, and a picture pattern layer, a back-surface primer layer, a backer layer, and like layers described below may be formed.

Picture Pattern Layer

The decorative sheet of the present invention may have a picture pattern layer.

The picture pattern layer gives a desired picture (design) to the decorative sheet, and the type etc. of picture are not limited. Examples include wood-grain patterns, leather patterns, marble grain patterns, pebbly patterns, tiled patterns, brick masonry patterns, textile patterns, geometric figures, characters, symbols, abstract patterns, and the like.

The method of forming the picture pattern layer is not particularly limited. For example, the picture pattern layer may be formed on the surface of the base material sheet by a printing method that uses ink obtained by dissolving (or dispersing) a known colorant (dye or pigment) together with a binding resin in a solvent (or a dispersion medium). The ink can be an aqueous composition, in terms of reducing the VOC of the sheet.

Examples of colorants include inorganic pigments, such as carbon black, titanium white, zinc white, red oxide, Berlin blue, and cadmium red; organic pigments, such as azo pigments, lake pigments, anthraquinone pigments, quinacridone pigments, phthalocyanine pigments, isoindolinone pigments, and dioxazine pigments; metallic powder pigments, such as aluminum powder and bronze powder; pearlescent pigments, such as titanium oxide-coated mica and bismuth chloride oxide; fluorescent pigments; noctilucent pigments; and the like. Such colorants may be used singly or in a combination of two or more. These colorants may be used in combination with a filler (e.g., silica), an extender pigment (e.g., organic beads), a neutralizer, a surfactant, etc.

Examples of binding resins include hydrophilized polyester-based urethane resins, which can be used in combination with polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic anhydride copolymers, cellulose-based resins, etc. Specific examples include polyacrylamide-based resins, poly(meth)acrylate-based resins, polyethylene oxide-based resins, poly N-vinyl-pyrrolidone-based resins, water-soluble polyester-based resins, water-soluble polyamide-based resins, water-soluble amino-based resins, water-soluble phenol-based resins, and other water-soluble synthetic resins; polynucleotides, polypeptides, polysaccharides, and like water-soluble natural polymers; etc. Other examples include natural rubber, synthetic rubber, polyvinyl acetate-based resins, (meth)acrylic-based resins, polyvinyl chloride-based resins, modified polyurethane-polyacrylic-based resins, etc., mixtures of natural rubber and the like mentioned above, and other resins. These binding resins can be used singly or in a combination of two or more.

Examples of the solvent (or dispersion medium) include petroleum-based organic solvents, such as hexane, heptane, octane, toluene, xylene, ethylbenzene, cyclohexane, and methylcyclohexane; ester-based organic solvents, such as ethyl acetate, butyl acetate, acetic acid-2-methoxyethyl, and acetic acid-2-ethoxyethyl; alcohol-based organic solvents, such as methyl alcohol, ethyl alcohol, normal propyl alcohol, isopropyl alcohol, isobutyl alcohol, ethylene glycol, and propylene glycol; ketone-based organic solvents, such as acetone, methyl ethyl ketone, methyl isobutyl ketone, and cyclohexanone; ether-based organic solvents, such as diethyl ether, dioxane, and tetrahydrofuran; chlorine-based organic solvents, such as dichloromethane, carbon tetrachloride, trichloroethylene, and tetrachloroethylene; inorganic solvents, such as water; and the like. These solvents (or dispersion media) can be used singly or in a combination of two or more.

Examples of the printing method for forming the picture pattern layer include gravure printing, offset printing, screen printing, flexo printing, electrostatic printing, ink jet printing, etc. When a solid-like picture pattern layer is formed over the entire surface, various coating methods, such as roll coating, knife coating, air-knife coating, dye coating, lip coating, comma coating, kiss coating, flow coating, and dip coating, can be used. In addition to the above, usable examples include hand-drawing methods, marbling methods, photographic methods, transfer methods, laser-beam drawing methods, electron-beam drawing methods, metal partial deposition methods, etching methods, etc. Alternatively, such methods can be used with other forming methods.

The thickness of the picture pattern layer is not particularly limited, and can be suitably determined according to product characteristics. The layer thickness is in the range of about 0.1 to 10 µm.

Adhesive Layer

In order to increase the adhesion between the respective layers, such as the adhesion between the transparent resin layer and the picture pattern layer, an adhesive layer may be formed. The adhesive layer is preferably a transparent adhesive layer. The transparent adhesive layer may be colorless transparent, colored transparent, semitransparent, or the like.

The adhesive is not particularly limited, and any adhesive known in the field of decorative sheets can be used. Examples of adhesives known in the field of decorative sheets include thermoplastic resins, such as polyamide resins, acrylic resins, and vinyl acetate resins; thermosetting resins, such as urethane-based resins; and the like. These adhesives can be used singly or in a combination of two or more. It is also possible to use a two-component curable polyurethane resin containing isocyanate as a curing agent or a polyester resin.

Although the thickness of the adhesive layer is not particularly limited, the thickness after drying is about 0.1 to 30 µm, and preferably about 1 to 20 µm.

Transparent Resin Layer

The decorative sheet of the present invention may have a transparent resin layer.

The transparent resin layer is not particularly limited as long as it is transparent, and may be colorless transparent, colored transparent, semitransparent, or the like. Examples of resins that constitute the transparent resin layer include polyethylene, ethylene-α olefin copolymers, polypropylene (e.g., homopolypropylene and random polypropylene), polymethylpentene, polybutene, ethylene-propylene copolymers, propylene-butene copolymers, ethylene-vinyl acetate copolymers, saponified products of ethylene-vinyl acetate copolymers, ethylene-(meth)acrylic acid copolymers, ethylene-(meth)acrylic acid ester copolymers, olefin-based resins (e.g., olefin-based elastomers), polyethylene terephthalate, polybutylene terephthalate, polyamide, ionomers, acrylic acid ester-based polymers, methacrylic acid ester-based polymers, polycarbonate, cellulose triacetate, and the like. These resins may be used singly or in a combination of two or more.

The transparent resin layer preferably comprises an olefin-based resin, which is typified by polypropylene resin or polyethylene resin. The resin that constitutes the transparent resin layer more preferably comprises an olefin-based resin or an ionomer resin mentioned above.

The transparent resin layer may be colored as long as it is transparent; however, it is particularly desirable that no colorant be mixed.

The thickness of the transparent resin layer is generally in the range of about 20 to 400 μm. The thickness of the transparent resin layer may exceed the above range, depending on, for example, the application of the decorative sheet.

Primer Layer

A primer layer may be provided on the transparent resin layer. The primer layer can be formed by applying a known primer agent to the surface of the transparent resin layer. Examples of primer agents include urethane resin primer agents comprising an acrylic-modified urethane resin (an acrylic urethane resin) etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay; flame retardants, such as magnesium hydroxide; antioxidants; lubricants; foaming agents; ultraviolet absorbers; light stabilizers; and the like. The amount of additives can be suitably determined according to product characteristics.

The thickness of the primer layer is not particularly limited, but is generally about 0.01 to 10 μm, and preferably about 0.1 to 1 μm.

Surface-Protecting Layer

The decorative sheet of the present invention has a surface-protecting layer. The surface-protecting layer is provided as the uppermost surface layer of the decorative sheet.

The resins that constitute the surface-protecting layer preferably comprise a curable resin, such as a thermosetting resin or an ionizing radiation-curable resin (e.g., an electron beam-curable resin). In particular, from the viewpoint of damage resistance due to a high level of surface hardness, convex shape retention, productivity, etc., the surface-protecting layer preferably comprises an ionizing radiation-curable resin, and the resins that constitute the surface-protecting layer more preferably comprise an ionizing radiation-curable resin.

Examples of thermosetting resins include unsaturated polyester resins, polyurethane resins (including two-component curable polyurethane), epoxy resins, amino alkyd resins, phenol resins, urea resins, diallyl phthalate resins, melamine resins, guanamine resins, melamine-urea copolycondensation resins, silicone resins, polysiloxane resins, and the like.

These resins may contain crosslinking agents, curing agents (e.g., polymerization initiators), polymerization accelerators, etc. Examples of curing agents include isocyanate, organic sulfonic acid salts, etc., which can be added to unsaturated polyester resins, polyurethane resins, etc.; organic amines etc., which can be added to epoxy resins; peroxides, such as methyl ethyl ketone peroxide; and radical initiators, such as azoisobutylnitrile, which can be added to unsaturated polyester resins.

As the method for forming the surface-protecting layer using a thermosetting resin, for example, a solution of a thermosetting resin is applied by a coating method, such as roll coating or gravure coating, followed by drying and curing.

The ionizing radiation-curable resin is not limited as long as it can undergo a crosslinking polymerization reaction upon irradiation with ionizing radiation and is formed into a three-dimensional polymer structure. For example, one or more types of prepolymers, oligomers, and monomers that have, in the molecule, a polymerizable unsaturated bond crosslinkable by irradiation with ionizing radiation, or an epoxy group, can be used. Specific examples include acrylate resins, such as urethane acrylate, polyester acrylate, and epoxy acrylate; silicone resins, such as siloxane; polyester resins; epoxy resins; and the like.

Examples of ionizing radiation include visible rays, ultraviolet rays (near ultraviolet rays, vacuum ultraviolet rays, etc.), X rays, electron beams, ionic lines, etc. Of these, ultraviolet rays and/or electron beams are desirable.

Examples of the source of ultraviolet rays include ultrahigh-pressure mercury lamps, high-pressure mercury lamps, low-pressure mercury lamps, carbon arc lamps, black-light fluorescent lamps, metal halide lamps, and like light sources. The wavelength of ultraviolet rays is about 190 to 380 nm.

Examples of the source of electron beams include various electron-beam accelerators, such as Cockoroft-Walton, Van de Graaff, resonance transformers, insulated core transformers, linear, Dynamitron, and high-frequency accelerators. The energy of the electron beam is preferably about 100 to 1000 keV, and more preferably about 100 to 300 keV. The exposure dose of the electron beam is preferably about 2 to 15 Mrad.

Although the ionizing-radiation-curable resin is sufficiently cured by irradiation with an electron beam, it is preferable to add a photopolymerization initiator (sensitizer) when the resin is cured by irradiation with ultraviolet rays.

The photopolymerization initiator used in the case of a resin having a radically polymerizable unsaturated group is, for example, at least one of the following: acetophenones, benzophenones, thioxanthones, benzoin, benzoin methyl ether, Michler's benzoyl benzoate, Michler's ketone, diphenyl sulfide, dibenzyl disulfide, diethyl oxide, triphenyl biimidazole, isopropyl-N,N-dimethylaminobenzoate, and the like. The photopolymerization initiator used in the case of a resin having a cation polymerizable functional group is, for example, at least one of the following: aromatic diazonium salts, aromatic sulfonium salts, metallocene compounds, benzoin sulfonate, furyloxy sulfoxonium diallyliodosyl salts, and the like.

The amount of the photopolymerization initiator added is not particularly limited. The amount is generally about 0.1 to 10 parts by mass, based on 100 parts by mass of ionizing radiation-curable resin.

The thickness of the surface-protecting layer is not particularly limited, and can be suitably determined according to the characteristics of the final product. The thickness of the surface-protecting layer is preferably 10 μm or more, and more preferably 11 to 40 μm.

The surface-protecting layer of the decorative sheet of the present invention has a surface free energy of 40 mJ/m$^2$ or more. When the surface-protecting layer has a surface free energy of less than 40 mJ/m$^2$, when grime strongly adheres to the surface of the decorative sheet, the grime cannot be easily wiped off, and the easy cleanability of the decorative sheet of the present invention cannot be sufficiently exerted. The surface free energy of the surface-protecting layer is preferably 44 mJ/m$^2$ or more, and more preferably 49 mJ/m$^2$ or more. The surface free energy of the surface-protecting layer is preferably 60 mJ/m² or less, more preferably 54 mJ/m² or less, and further preferably 53 mJ/m² or less.

The method for adjusting the surface free energy of the surface-protecting layer to 40 mJ/m² or more is preferably, for example, a method of adding an inorganic filler to the surface-protecting layer, or the like. When this method is performed, the surface free energy is preferably adjusted by a method of adding an inorganic filler, preferably a hydrophobized inorganic filler (hydrophobic inorganic filler), to the surface-protecting layer, or a method of adding both a hydrophobized inorganic filler and an untreated inorganic filler to the surface-protecting layer.

The method of measuring the surface free energy in this specification is as follows. Specifically, the contact angle of water, diiodomethane, and n-hexadecane with the surface of each decorative sheet is measured by the sessile drop method by using an automatic contact angle meter (Dropmaster 300 produced by Kyowa Interface Science Co., Ltd.). The measurement conditions for the sessile drop method were as follows: droplet amount: water and n-hexadecane: 2 µL, diiodomethane: 1 µL; distance between solid and dotted lines on an image monitor screen with a standard field of view: 153; measured 5 seconds after the droplet drops onto the surface; environmental temperature: 23±3° C.; environmental moisture: 50±10%. The surface free energy was determined from the measurement results with reference to the Kitazaki-Hata theory (Journal of the Adhesion Society of Japan (1972), J. Adhesion (1987)).

The surface-protecting layer of the decorative sheet of the present invention has an arithmetic average roughness (Ra0.08) of 0.60 µm or less when measured at a cutoff value of 0.08 mm with an evaluation length of 0.4 mm by a measurement method in accordance with JIS B0601:2001. When Ra0.08 is more than 0.60 µm, grime strongly adhering to the surface of the decorative sheet cannot be easily wiped off, and the easy cleanability of the decorative sheet of the present invention cannot be sufficiently exerted. Ra0.08 of the surface-protecting layer is preferably 0.58 µm or less. Ra0.08 of the surface-protecting layer is preferably 0.40 µm or more, more preferably 0.50 µm or more. With the above arithmetic average roughness range, the decorative sheet of the present invention ensures superior scratch resistance.

The method for adjusting Ra0.08 of the surface-protecting layer to 0.60 µm or less is preferably, for example, 1) a method of adding an inorganic filler to the surface-protecting layer, or a method of forming embossed patterns using an embossing plate, or the like. When method 1) is performed, Ra0.08 is preferably adjusted by a method of adding an inorganic filler, preferably a hydrophobized inorganic filler (hydrophobic inorganic filler), to the surface-protecting layer, or a method of adding both the hydrophobized inorganic filler and the untreated inorganic filler to the surface-protecting layer.

In this specification, the arithmetic average roughness (Ra0.08) is measured by a method according to JIS B0601: 2001 by using a surface roughness measuring apparatus (Tokyo Seimitsu Co., Ltd., model: SURFCOM FLEX-50A) at a cutoff value of 0.08 mm, evaluation length of 0.4 mm, and a measurement rate of 0.6 mm/s. The measurement is performed at arbitrary five points along an arbitrary direction, and the measured values are averaged to determine a measurement value.

Examples of inorganic fillers include silica, aluminum oxide, silicon carbide, silicon dioxide, calcium titanate, barium titanate, magnesium pyroborate, zinc oxide, silicon nitride, zirconium oxide, chromium oxide, iron oxide, boron nitride, diamond, emery, glass fiber, and the like. Any of these fillers (untreated inorganic fillers), and those obtained by hydrophobizing these fillers (hydrophobized inorganic fillers), can be used as the inorganic filler. Hydrophobized inorganic fillers are preferable as inorganic fillers.

The method of hydrophobizing the inorganic filler is not particularly limited. The inorganic filler can be hydrophobized by a known method. Examples of methods include a method of hydrophobizing an inorganic filler by a silicone oil treatment agent; a method of treating an inorganic filler with an alkyl silazane treatment agent, a trimethylsilylating agent, and/or alkoxysilane, and then treating the filler with a silicone oil treatment agent described above; a method of treating an inorganic filler with a silicone oil treatment agent and then further treating the filler with a trimethylsilylating agent or an alkylsilazane treatment agent; a method of hydrophobizing an inorganic filler with alkoxysilane; a method of treating an inorganic filler with alkoxysilane and then with a silicone oil treatment agent alone or a silicone oil treatment agent and alkoxysilane; a method of treating an inorganic filler with dimer diol siloxane and/or trimethyl silanol or cyclosiloxane; and the like. Examples of hydrophobizing treatment methods include not only those mentioned above but also other methods, such as treatment methods using various coupling agents (e.g., silane coupling agents, titanate coupling agents, and aluminate coupling agents), surfactants (e.g., phosphoric acid-based surfactants and fatty acid-based surfactants), oils and fats, and stearic acid. The various products for hydrophobizing untreated inorganic fillers (for example, all of the treatment agents such as silicone oil treatment agents, silane coupling agents, and surfactants) described above may be hereinafter collectively referred to as "hydrophobizing agents."

Examples of silicone oil treatment agents include, but are not limited to, straight silicone oils such as dimethyl silicone oil, methyl phenyl silicone oil, and methyl hydrogen silicone oil; and modified silicone oils such as amino modified silicone oil, epoxy modified silicone oil, carboxyl modified silicone oil, carbinol modified silicone oil, methacrylic modified silicone oil, mercapto modified silicone oil, phenol modified silicone oil, one-terminal reactive modified silicone oil, heterofunctional-group modified silicone oil, polyether modified silicone oil, methyl styryl modified silicone oil, alkyl modified silicone oil, higher fatty ester modified silicone oil, hydrophilic specialty modified silicone oil, higher-alkoxyl modified silicone oil, higher fatty acid-containing modified silicone oil, and fluorine modified silicone oil.

Examples of alkylsilazane treatment agents include, but are not limited to, hexamethyl disilazane, vinyl silazane, and the like.

Examples of trimethylsilylating agents include trimethylsilanol, trimethylmethoxysilane, trimethylchlorosilane, aminomethyltrimethylsilane, dimethylaminotrimethylsilane, and diethylaminotrimethylsilane.

Examples of alkoxysilanes include, but are not limited to, alkoxy silane compounds contained in the silane coupling agents described below.

Examples of silane coupling agents include, but are not limited to, alkoxy silane compounds such as methyltrimethoxysilane, dimethyldimethoxysilane, trimethylmethoxysilane, methyltriethoxysilane, dimethyldiethoxysilane, trimethylethoxysilane, n-hexyltrimethoxysilane, n-hexyltriethoxysilane, n-octyltriethoxysilane, decyltriethoxysilane, phenyltrimethoxysilane, benzyltriethoxysilane, propyltrimethoxysilane, propyltriethoxysilane, diethoxymethylphenylsilane, allyltriethoxysilane, vinyltrimethoxysilane, vinyltriethoxysilane, and aminopropyltriethoxysilane, aminopropyltrimethoxysilane; chlorosilane compounds such as trimethylchlorosilane and diethyl dichlorosilane; and the like.

Examples of titanate-based coupling agents include, but are not limited to, isopropyl tridecylbenzenesulphonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl-1-butyl) bis(di-tridecyl)phosphite titanate, bis(dioctylpyrophosphate) oxyacetate titanate, bis(dioctylpyrophosphate)ethylene titanate, isopropyl tri(N-aminoethyl-aminoethyl)titanate, and the like.

Examples of aluminate coupling agents include, but are not limited to, acetoalkoxy aluminum diisopropylate, and the like.

The surfactant is not particularly limited. For example, any of the following can be used: anionic surfactants, cationic surfactants, nonionic surfactants, and amphoteric surfactants. The oils and fats are not particularly limited. Various known oils and fats can be used.

The method for hydrophobizing an inorganic filler with the various hydrophobizing agents mentioned above is not particularly limited. The hydrophobizing treatment can be performed by a known method. Examples include a method of adding (e.g., spraying) to an untreated inorganic filler a stock solution of a hydrophobizing agent or a dilute of a hydrophobizing agent in water or an organic solvent (dry treatment method); a method of treating (e.g., immersing) an untreated inorganic filler in a stock solution of a hydrophobizing agent, an aqueous solution of a hydrophobizing agent, or a solvent containing a hydrophobizing agent, and then drying (wet-treatment method); and the like. With such treatment, a part or all of the surface of the inorganic filler is, for example, (a) coated with a hydrophobizing agent, (b) adsorbed on a hydrophobizing agent, or (c) coated with and adsorbed on a hydrophobizing agent (a combination of (a) and (b)). As a result, a hydrophobized inorganic filler is obtained. Such various hydrophobizing agents may be used singly or in a combination of two or more.

The inorganic fillers can be used singly or in a combination of two or more. An untreated inorganic filler and a hydrophobized inorganic filler may be used in combination. Various commercially available products can be used as the untreated inorganic filler and the hydrophobized inorganic filler.

Among the inorganic fillers that can be used in the present invention, hydrophobized inorganic fillers (hydrophobic inorganic fillers) are preferable, and hydrophobized silica (hydrophobic silica) is more preferable from the viewpoint of physical properties for use in floors, coating aptitude of the surface-protecting layer, the matte effect of the decorative sheet, etc.

From the viewpoint of easy cleanability, the hydrophobized inorganic filler content of the surface-protecting layer is preferably 0.5 to 30 parts by mass, more preferably 1 to 25 parts by mass, and still more preferably 5 to 20 parts by mass, based on 100 parts by mass of the resins (resin components) that constitute the surface-protecting layer.

The shape of the hydrophobized inorganic filler is not particularly limited, and may be, for example, spherical, cubic, rods, plates, or needles.

When the hydrophobized inorganic filler (hydrophobic inorganic filler) is spherical, the particle size (and average particle diameter) of the hydrophobized inorganic filler is not particularly limited. For example, an inorganic filler with a mode diameter (a particle size at a local maximum in a particle size distribution and the most frequently occurring particle size) of about 1 to 10 μm is preferable, and a hydrophobized inorganic filler with a mode diameter of 2 to 6 μm is more preferable. To enhance easy cleanability, the particle size of the hydrophobized inorganic filler is preferably ½ the thickness of the surface-protecting layer, or less. For example, when the surface-protecting layer is 10 μm, the inorganic filler preferably has a particle size of 5 μm or less. The particle size (mode diameter) of the hydrophobized inorganic filler of the present invention is a value measured by a light scattering method.

When a hydrophobized inorganic filler and an untreated inorganic filler are used in combination, the amount of the untreated inorganic filler to be used is preferably 0.5 to 15 parts by mass, and more preferably 1 to 10 parts by mass, based on 100 parts by mass of the resins (resin components) that constitute the surface-protecting layer. The particle size of the untreated inorganic filler is preferably such that the mode diameter is about 1 to 15 μm.

The surface-protecting layer may further contain various additives, such as solvents, colorants (e.g., dyes and pigments), matting agents, fillers (e.g., extenders), antifoaming agents, leveling agents, and thixotropy-imparting agents, as required.

Examples of the method for forming a surface-protecting layer comprising an ionizing radiation-curable resin include a method comprising applying a solution (a surface-protecting layer-forming resin composition) containing (1) a resin (e.g., an ionizing radiation-curable resin) and an hydrophobized inorganic filler, optionally with (2) other resins, an ultraviolet absorber, an antibacterial agent, the various additives mentioned above, and the like by gravure coating, roll coating, or the like, followed by curing the ionizing-radiation-curable resin.

Back-Surface Primer Layer

A back-surface primer layer may be formed on the back surface (the surface opposite to the surface on which the picture pattern layer is laminated) of the base material sheet, as required. For example, the back-surface primer layer is effective when the decorative sheet is laminated on an adherend to form a decorative plate.

The back-surface primer layer can be formed by applying a known primer agent to the base material sheet. Examples of primer agents include urethane resin primer agents comprising an acrylic-modified urethane resin (an acrylic urethane resin) etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay, flame retardants, such as magnesium hydroxide, antioxidants, lubricants, foaming agents, ultraviolet absorbers, and light stabilizers. The amount of additives can be suitably determined according to product characteristics.

The thickness of the back-surface primer layer is not particularly limited, but is generally 0.01 to 10 μm, and preferably about 0.1 to 1 μm.

Backer Layer

A backer layer (a synthetic resin layer for improving damage resistance and reducing the effect of an adherend) is optionally provided on the back surface of the base material sheet (if the picture pattern layer is formed on the back surface of the base material sheet, then on the back surface of the picture pattern layer). The damage resistance particularly refers to resistance to formation of dents when a load is partially applied. Although the decorative sheet of the present invention has sufficient damage resistance even without a backer layer, the presence of a backer layer can further improve various types of performance, such as damage resistance.

The backer layer is suitably formed by subjecting a molten resin to extrusion molding. For example, extrusion molding using a T-die is suitable.

Examples of the method for bonding the back surface of the base material sheet and the backer layer include a method for bonding, by heat welding, the base material sheet and a backer layer obtained by subjecting a molten resin to extrusion molding; a method of providing an adhesive layer (and further a primer layer, if required) between the base material sheet and the backer layer to achieve bonding; and the like.

Examples of resins that constitute the backer layer include, but are not limited to, thermoplastic resins, such as polyethylene, polypropylene (PP), polyvinyl alcohol, ethylene-vinyl alcohol copolymers, polymethylene, polymethylpentene, polyethylene terephthalate, amorphous polyethylene terephthalate (A-PET), highly thermal resistant polyalkylene terephthalates (e.g., PET-G, product name (produced by Eastman Chemical Company), which is polyethylene terephthalate in which a part of the ethylene glycol is substituted by 1,4-cyclohexane dimethanol, diethylene glycol, or the like), polybutylene terephthalate (PBT), polycarbonate, polyarylate, polyethylene naphthalate, polyethylene naphthalate-isophthalate copolymers, polyimide, polystyrene, polyamide, ABS (acrylonitrile-butadiene-styrene copolymers), and the like. These resins may be used singly or in a combination of two or more.

The thickness of the backer layer can be suitably determined depending on the application of the final product, the method of use of the final product, etc. In general, the thickness is preferably 80 to 800 μm. Within this range, the thickness is more preferably 100 to 600 μm.

The adhesion surface of the backer layer may be subjected to a known adhesion-enhancing treatment, such as corona discharge treatment, plasma treatment, degreasing treatment, or surface-roughening treatment, as required. Moreover, in consideration of the adhesion with an adherend, a primer layer may be further provided on the back surface of the backer layer.

The various additives to be added to the layers of the decorative sheet of the present invention described above (such as the inorganic filler or the like to be added to the surface-protecting layer) are preferably formed into vesicles. Examples of the method for forming various additives into vesicles are not particularly limited, and known methods may be used to form the vesicles. Among various methods, the supercritical reverse phase evaporation method is preferable.

The supercritical reverse phase evaporation method is specifically explained below. The supercritical reverse phase evaporation method refers to a method of adding an aqueous phase containing various additives as water-soluble or hydrophilic encapsulation materials to a mixture in which a material for forming the outer membrane of the vesicle is evenly dissolved in carbon dioxide in an supercritical state or carbon dioxide at a temperature or a pressure condition equal to or more than the supercritical point, thereby forming a capsule-like vesicle in which the various additives as encapsulation materials are encapsulated with a single membrane. "Carbon dioxide in an supercritical state" refers to carbon dioxide in an supercritical state at a temperature equal to or more than the critical temperature (30.98° C.) and a pressure equal to or more than the critical pressure (7.3773±0.0030 MPa), and "carbon dioxide at a temperature or a pressure condition equal to or more than the critical point" refers to carbon dioxide under a condition in which only the critical temperature or only the critical pressure exceeds the critical condition. This method can produce a single-walled lamellar vesicle having a diameter of 50 to 800 nm. "Vesicle" is the general name of a folliculus having a spherically closed membrane structure containing a liquid phase. In particular, those having an outer membrane formed of a biological lipid such as a phospholipid is called a liposome.

Examples of phospholipids include phosphatidylcholine, phosphatidylethanolamine, phosphatidylserine, phosphatidic acid, phosphatidylglycerol, phosphatidylinositol, cardiolipin, egg yolk lecithin, hydrogenated egg york lecithin, soybean lecithin, hydrogenated soybean lecithin, and like glycerophospholipids; sphingomyelin, ceramide phosphorylethanolamine, ceramide phosphorylglycerol and like sphingophospholipids.

Other examples of the materials constituting the outer layer also include nonionic surfactants and dispersants such as a mixture of these surfactants and cholesterols or triacylglycerols.

Examples of nonionic surfactants include one or more members selected from polyglycerolether, dialkylglycerol, polyoxyethylene hardened castor oil, polyoxyethylene alkylether, polyoxyethylene sorbitan fatty acid ester, sorbitan fatty acid ester, polyoxyethylene polyoxypropylene copolymers, polybutadiene-polyoxyethylene copolymers, polybutadiene-poly2-vinylpyridine, polystyrene-polyacrylic acid copolymers, polyethylene oxide-polyethyl ethylene copolymers, polyoxyethylene-polycaprolactam copolymers and the like.

Examples of the cholesterols include one or more members selected from cholesterol, α-cholestanol, β-cholestanol, cholestane, desmosterol (5,24-cholestadiene-3β-ol), sodium cholate, cholecalciferol, and the like.

The outer membrane of the liposome may be formed from a mixture of phospholipid and a dispersant. By forming an outer layer as a liposome formed of a phospholipid, the decorative sheet of the present invention ensures desirable compatibility between the resin composition, which is the main component of each layer, and various additives.

Embossing

The decorative sheet may be embossed on the uppermost surface layer side, as required.

The embossing method is not particularly limited. For example, the following method is preferable: after the front surface of the surface-protecting layer is softened by heating, and pressed and shaped by using an embossing plate, cooling is performed. Depending on the material of the decorative sheet, which is a final product, or the surface-protecting layer, for example, after the front surface of the transparent resin layer is softened by heating, and pressed and shaped by using an embossing plate, a surface-protecting layer may be formed on the resin layer.

The embossing is conducted using a known sheet-fed or rotary embossing machine. Examples of irregular shapes include wood-grain vessel patterns, stone sheet surface irregular patterns (e.g., granite cleavage planes), textile surface textures, matte patterns, grain patterns, hairline patterns, linear streak patterns, and the like.

In the decorative sheet of the present invention, the specular glossiness on the surface-protecting layer side at an incident angle of 60° is 23 or less. When the specular glossiness is more than 23, gloss appears, and a design with low-gloss feeling cannot be expressed. As a result, the designability decreases. The specular glossiness is preferably 14 or less and more preferably 10 or less. The lower limit of the specular glossiness is preferably, but not particularly limited to, 5.

The method for adjusting the specular glossiness of the surface-protecting layer side at an incident angle of 60° to 23 or less includes 1) a method of adding an inorganic filler to the surface-protecting layer, 2) a method of forming embossed patterns using an embossing plate, and the like. It is preferable to adjust the specular glossiness at an incident angle of 60° of the surface-protecting layer side of the decorative sheet by a method of adding an inorganic filler, preferably a hydrophobized inorganic filler (hydrophobic inorganic filler), to the surface-protecting layer, or a method of adding both an inorganic filler and a hydrophobized inorganic filler.

The specular glossiness at an incident angle of 60° of the surface-protecting layer side of the decorative sheet in this specification is measured according to Japanese Industrial Standard JIS Z8741:1997. Specifically, specular glossiness is measured with a glossmeter (GMX-202, produced by Murakami Color Research Laboratory) along an arbitrary direction of the decorative sheet.

2. Decorative Plate of Present Invention

Figure 3:
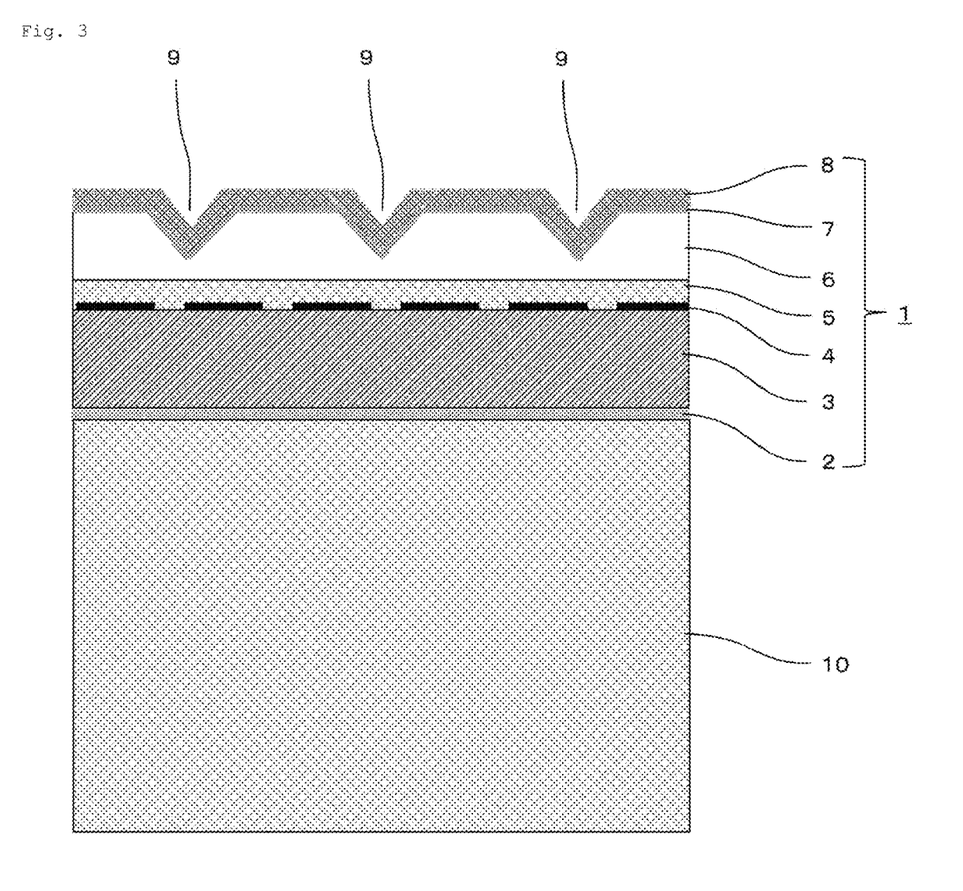
FIG. 3 is a cross-sectional view illustrating an example of the decorative plate of the present invention.

A decorative plate can be produced by laminating the above decorative sheet on an adherend. FIG. 3 shows an example of the layer structure of the decorative plate of the present invention. In FIG. 3, the decorative plate of the present invention is formed by lamination in a manner such that an adherend 10 comes in contact with the plane having a back-surface primer layer 2 of the decorative sheet 1. The adherend is not limited, and adherends used for known decorative plates can be used. Examples of the adherend include wood-based materials, metals, ceramics, plastics, glass, and the like. In particular, wood-based materials can be preferably used for the decorative sheet. Specific examples of wood-based materials include sliced veneers, single panels, plywood panels, particle boards, wooden-based fiberboards (HDF, MDF), chipboards, composite base materials in which a chipboard is laminated, and the like that are formed from various materials, such as Japanese cedar, Japanese cypress, zelkova, pine, lauan, teak, and melapi. Preferred wood-based materials are plywood panels, particle board, and wood-based fiberboards (HDF, MDF).

The method for laminating the decorative sheet and an adherend is not limited. For example, the decorative sheet can be bonded to an adherend by using an adhesive. The adhesive may be suitably selected from known adhesives depending on, for example, the type of adherend. Examples include polyvinyl acetate, polyvinyl chloride, vinyl chloride-vinyl acetate copolymers, ethylene-acrylic acid copolymers, ionomers, butadiene-acrylonitrile rubber, neoprene rubber, natural rubber, and the like. These adhesives are used singly or in a combination of two or more.

EXAMPLES

The following describes the present invention in detail with reference to Examples and Comparative Examples. However, the present invention is not limited to the embodiments of the Examples.

Example 1

Production of Decorative Sheet

A 1-μm-thick primer layer (back-surface primer layer) was provided on the back surface of a base material sheet comprising a 60-μm-thick colored polypropylene film. Next, a 2-μm-thick picture pattern layer was formed by printing on the front surface of the base material sheet, and an adhesive layer was further formed on the picture pattern layer. Next, an 80-μm-thick sheet of transparent polypropylene-based resin (transparent random polypropylene-based resin) was laminated on the adhesive layer by an extrusion lamination method to form a transparent resin layer. Subsequently, the surface of the transparent random polypropylene-based resin sheet was subjected to a corona discharge treatment, and then coated with a two-component curable urethane resin to form a 1-μm-thick primer layer. Thereafter, a surface-protecting layer-forming resin composition comprising 70 parts by mass of a difunctional urethane acrylate oligomer α, 30 parts by mass of a hexafunctional aliphatic urethane acrylate oligomer, 6.8 parts by mass of untreated silica (mode diameter: 3 μm), and 10.2 parts by mass of hydrophobic silica (hydrophobized A) hydrophobized with silicone oil (mode diameter: 3 μm) was applied to the front surface of the primer layer by a gravure coating method to form a coating film. The coating film was then cured by irradiation with an electron beam by using an electron beam irradiation device in an environment with an oxygen concentration of 200 ppm or less at an acceleration voltage of 175 KeV with a dose of 5 Mrad. Thus, a 13-μm-thick surface-protecting layer was formed. Further, the surface-protecting layer side was heated with a non-contact infrared heater to thereby soften the base material sheet and the transparent resin layer, and embossing was conducted by hot pressing to form an irregular pattern of a matte pattern. A decorative sheet was thus produced.

Production of Decorative Plate

A 2.5-mm-thick medium-density wood fiberboard (MDF) was uniformly coated with an aqueous emulsion adhesive (BA-10L (main agent):BA-11B (curing agent)=100:2.5 (mass ratio), produced by Japan Coating Resin Co., Ltd.) in an amount of 80 g/m² and bonded to the back-surface primer layer side of the decorative sheet obtained above, followed by curing at room temperature for 3 days, thereby producing a decorative plate of Example 1.

Examples 2 to 8 and Comparative Examples 1 to 6

Decorative sheets and decorative plates were produced as in Example 1 except that resin, silica, and an additive used for a surface-protecting layer-forming composition of a surface-protecting layer, and the thickness of a coating film were changed to those shown in Table 1 or 2, and the irregular pattern was changed to that having an arithmetic average roughness shown in Table 1 or 2.

The types of resins in Tables 1 and 2 are as follows.

Difunctional α: a difunctional urethane acrylate oligomer (polyol component: polyester diol; glass transition temperature: 25° C.; weight average molecular weight: 1500);

Difunctional β: a difunctional urethane acrylate oligomer (polyol component: polyester diol; glass transition temperature: 25° C.; weight average molecular weight: 1200);

Difunctional γ: a difunctional urethane acrylate oligomer (polyol component: polyester diol; glass transition temperature: −55° C.; weight average molecular weight: 5000); and Hexafunctional: a hexafunctional aliphatic urethane acrylate oligomer (glass transition temperature: 200° C. or more; weight average molecular weight: 1500, UA306H, produced by Kyoeisha Chemical Co., Ltd.).

The surface free energy of the surface-protecting layer is measured by the following measurement method. Specifically, the contact angle of water, diiodomethane, and n-hexadecane with the surface of each decorative sheet was measured by the sessile drop method using an automatic contact angle meter (Dropmaster 300 produced by Kyowa Interface Science Co., Ltd.). The measurement conditions of the sessile drop method were as follows: droplet amount: water and n-hexadecane: 2 μL; diiodomethane: 1 μL; distance between solid and dotted lines on an image monitor screen with a standard field of view: 153; measured 5 seconds after the droplet drops on the surface; environmental temperature: 23±3° C.; environmental moisture: 50±10%. The surface free energy was determined from the measurement results with reference to the Kitazaki-Hata theory (Journal of the Adhesion Society of Japan (1972), J. Adhesion (1987)).

The arithmetic average roughness (Ra 0.08) on the surface side of the surface-protecting layer was measured by a measurement method in accordance with JIS B0601:2001 by using a surface roughness measuring apparatus (SURFCOM FLEX-50A produced by Tokyo Seimitsu Co., Ltd.) under the following measurement conditions: cutoff value: 0.08 mm; evaluation length: 0.4 mm; measurement rate: 0.6 mm/s. The measurement was performed at 5 arbitrarily selected points in an arbitrarily selected direction. The average value of the 5 points was obtained as the measurement value.

The specular glossiness at an incident angle of 60° on the surface-protecting layer side of the decorative sheet was measured along an arbitrarily selected direction of the decorative sheet by the method in accordance with Japanese Industrial Standard JIS Z8741:1997 by using a gloss meter (GMX-202 produced by Murakami Color Research Laboratory).

Using the decorative plates produced by the Examples and Comparative Examples, the following evaluation was performed.

Evaluation 1: Easy Cleanability (Ease of Wiping)

Easy cleanability (ease of wiping) was evaluated by performing Items (1) to (9) described below.

(1) Putty powder (Wide Super 60 produced by Yayoi Chemical Industry Co., Ltd.) was cured by adding water, and filed with a #180 file to obtain gypsum powder. The mixing ratio of the putty powder and water was 60:40 (mass ratio).
(2) The gypsum powder was sprayed over the entire front surface (decorative sheet side) of each of the decorative plates obtained in the Examples and Comparative Examples in an amount of about 1 g/shakkaku. Then, the gypsum powder was thinly spread over the surface of each decorative plate with a dry rag (toweling fabric).
(3) Subsequently, 0.2 g of water was added dropwise to the surface of each decorative plate.
(4) A load of 156.3 g/cm$^2$ was applied to the portion on which water was dropped. Specifically, the back surface (made of vinyl chloride resin) of a slipper (produced by Nippon Slipper Co., Ltd.) cut to a size of 8 cm×8 cm was applied as a contacting unit to the front surface of a 10-kg plate to produce a weight. The weight was placed on the surface of the decorative sheet so that the contacting unit was in contact with the portion on which water was dropped, thereby applying the load. Subsequently, the weight was rotated 360°, and then removed from the surface of the decorative sheet.
(5) 0.2 g of gypsum powder was again uniformly sprayed over the portion where the gypsum powder had been removed in a circle by the rotation of the contacting unit.
(6) Next, 0.2 g of water was added dropwise on the sprayed gypsum powder.
(7) As in Item (4), a load of 156.3 g/cm$^2$ was applied to the portion on which water was dropped, and the weight was rotated 360°. Thereafter, the weight was removed from the surface of the decorative sheet.
(8) Items (5) to (7) were repeated again to produce a contamination part.
(9) After the contamination part was allowed to stand for at least 30 minutes, it was wiped with water back and forth using a toweling fabric rag.

Grime conditions after a load of 156.3 g/cm$^2$ was applied three times by performing Items (1) to (9) above were visually observed and evaluated according to the following evaluation criteria. An evaluation of ++ or higher is considered to be satisfactory for practical use.

+++: No grime remained.
++: Slight grime remained.
+: Grime remained.
−: A lot of grime remained.

Evaluation 2: Easy Cleanability (Wiping Resistance)

The coefficient of slip resistance (CSR value) of decorative sheets of decorative plates was measured on the surface-protecting layer side with 100% cotton socks by using a Tokyo Institute of Technology sliding tester (O-Y·PSM). The evaluation criteria are as follows. An evaluation of + or higher is considered to be satisfactory for practical use.

+++: The evaluation value was less than 0.3.
++: The evaluation value was 0.3 or more and less than 0.4.
+: The evaluation value was 0.4 or more and less than 0.5.
−: The evaluation value was 0.5 or more.

Evaluation 3: Designability 20 subjects visually observed the surface of each decorative sheet and evaluated it according to the following evaluation criteria. An evaluation of + or higher is considered to be satisfactory for practical use.

+++: At least 15 subjects sensed low gloss and excellent designability.
++: 10 or more to less than 15 subjects sensed low gloss and excellent designability.
+: 5 or more to less than 10 subjects sensed low gloss and excellent designability.
−: Less than 5 subjects sensed low gloss and excellent designability.

Evaluation 4: Scratch Resistance

After completion of the evaluation of easy cleanability (ease of wiping), the grime in the contamination parts was all removed. Appearance in the contamination parts was visually observed and evaluated according to the following evaluation criteria. An evaluation of + or higher is considered to be satisfactory for practical use.

+++: No gloss change.
++: Slight gloss change.
+: Gloss change.
−: Significant gloss change.

Evaluation 5: Walking Feeling

As the coefficient of slip resistance decreases, subjects are more likely to slip and walking becomes difficult, thus reducing walking feeling. In light of this, walking feeling was evaluated. Specifically, as in Evaluation 2, the coefficient of slip resistance (CSR value) of decorative sheets of decorative plates was measured on the surface-protecting layer side. The evaluation criteria are as follows. An evaluation of + or higher is considered to be satisfactory for practical use.

+++: The evaluation value was 0.5 or more.
++: The evaluation value was 0.4 or more to less than 0.5.
+: The evaluation value was 0.3 or more to less than 0.4.
−: The evaluation value was less than 0.3.

The results are shown in Tables 1 and 2 below.

TABLE 1

| | | | Example 1 | Example 2 | Example 3 | Example 4 | Example 5 | Example 6 | Example 7 | Example 8 |
|---|---|---|---|---|---|---|---|---|---|---|
| Surface-protecting layer | | Thickness (μm) | 13 | 15 | 15 | 13 | 13 | 15 | 15 | 13 |
| | Resin (parts by mass) | Difunctional α | 70 | — | — | 70 | 70 | 80 | 80 | 70 |
| | | Difunctional β | — | 52 | 52 | — | — | — | — | — |
| | | Difunctional γ | — | 18 | 18 | — | — | — | — | — |
| | | Hexafunctional | 30 | 30 | 30 | 30 | 30 | 20 | 20 | 30 |
| | Inorganic filler | Kind | Silica | Silica | Silica | Silica | Silica | Silica | Silica | Silica |
| | | Mode diameter (μm) | 3/3 | 10 | 12 | 3 | 3/3 | 3/4.5/12 | 3/4.5/12 | 3/3 |
| | | Treatment | Untreated/Hydrophobized A | Untreated | Untreated | Untreated | Untreated/Hydrophobized B | Hydrophobized B/Untreated/Untreated | Hydrophobized B/Untreated/Untreated | Untreated/Hydrophobized A |
| | | Addition amount (per 100 parts by mass of resin) | 6.8/10.2 | 9 | 7 | 13 | 11.2/2.8 | 12/4/4 | 13.8/4.6/4.6 | 10.4/15.6 |
| | Adduct | Kind | — | — | — | — | — | — | — | — |
| | | Addition amount (per 100 parts by mass of resin) | — | — | — | — | — | — | — | — |
| Arithmetic average roughness Ra 0.08 (μm) | | CF 0.08 mm Evaluation length: 0.4 mm | 0.30 | 0.31 | 0.38 | 0.39 | 0.39 | 0.50 | 0.57 | 0.48 |
| Surface free energy (mJ/m²) | | (water, diiodomethane, and n-hexadecane) | 40.6 | 57.2 | 56.6 | 53.7 | 44.5 | 46 | 52.8 | 49.6 |
| Specular glossiness at an incident angle of 60° | | | 17 | 19 | 20 | 15 | 16 | 17 | 10 | 6 |
| Designability | | | + | + | + | + | + | + | +++ | +++ |
| Easy cleanability (ease of wiping) | | | +++ | +++ | +++ | +++ | +++ | +++ | ++ | ++ |
| Easy cleanability (wiping resistance) | | | ++ | + | + | ++ | ++ | ++ | ++ | ++ |
| Scratch resistance | | | +++ | +++ | +++ | +++ | +++ | +++ | ++ | + |
| Walking feeling | | | + | ++ | ++ | + | + | + | + | + |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Surface-protecting layer | | Thickness (μm) | 15 | 15 | 15 | 15 | 13 | 15 |
| | Resin (parts by mass) | Difunctional α | 80 | 80 | 45 | — | 40 | 80 |
| | | Difunctional β | — | — | — | 52 | — | — |
| | | Difunctional γ | — | — | — | 18 | — | — |
| | | Hexafunctional | 20 | 20 | 55 | 30 | 60 | 20 |
| | Inorganic filler | Kind | Silica | Silica | Silica | Silica | Silica | Silica |
| | | Mode diameter (μm) | 11 | 12 | 10 | 12 | 3/4.5/12 | 11 |
| | | Treatment | Untreated | Untreated | Untreated | Untreated | Hydrophobized B/Untreated/Untreated | Untreated |
| | | Addition amount (per 100 parts by mass of resin) | 17 | 13 | 8 | 20 | 13.8/4.6/4.6 | 17 |
| | Adduct | Kind | — | — | — | — | — | PE wax |
| | | Addition amount (per 100 parts by mass of resin) | — | — | — | — | — | 1 |
| Arithmetic average roughness Ra 0.08 (μm) | | CF 0.08 mm Evaluation length: 0.4 mm | 0.63 | 0.66 | 0.28 | 0.62 | 0.57 | 0.63 |
| Surface free energy (mJ/m²) | | (water, diiodomethane, and n-hexadecane) | 39.8 | 38 | 62 | 50.1 | 38.5 | 28.7 |
| Specular glossiness at an incident angle of 60° | | | 6 | 14 | 24 | 13 | 10 | 6 |
| Designability | | | +++ | ++ | − | ++ | +++ | +++ |
| Easy cleanability (ease of wiping) | | | − | + | ++ | + | + | + |
| Easy cleanability (wiping resistance) | | | ++ | ++ | ++ | + | ++ | +++ |
| Scratch resistance | | | ++ | +++ | ++ | +++ | ++ | ++ |
| Walking feeling | | | + | + | + | ++ | + | − |

DESCRIPTION OF REFERENCE NUMERALS

1. Decorative sheet
2. Back-surface primer layer
3. Base material sheet
4. Picture pattern layer
5. Adhesive layer
6. Transparent resin layer
7. Primer layer
8. Surface-protecting layer
9. Embossed pattern (wood-grain vessel pattern)
10. Adherend

The invention claimed is:

1. A decorative sheet comprising a base material sheet and at least a transparent resin layer and a surface-protecting layer on the base material sheet,
   (1) the base material sheet being a thermoplastic resin sheet,
   (2) the surface-protecting layer having a surface free energy of 40 mJ/m$^2$ or more and 54 mJ/m$^2$ or less,
   (3) an arithmetic average roughness (Ra0.08) measured on the surface side of the surface-protecting layer at a cutoff value of 0.08 mm with an evaluation length of 0.4 mm by a measurement method in accordance with JIS B0601:2001 being 0.60 µm or less,
   (4) a specular glossiness on the surface-protecting layer side of the decorative sheet at an incident angle of 60° being 23 or less,
   (5) the surface-protecting layer consisting essentially of a curable resin, an inorganic filler having a particle size of ½ the thickness of the surface-protecting layer or less, and, optionally, one or more crosslinking agents, curing agents, or polymerization accelerators, wherein the inorganic filler has a particle size of 2 µm or more and 5 µm or less in terms of mode diameter, and wherein the thickness of the surface-protecting layer is 11 to 40 µm, and,
   (6) the transparent resin layer comprising at least one member selected from the group consisting of olefin-based elastomers, polyethylene terephthalate, polybutylene terephthalate, polyamide, ionomers, acrylic acid ester-based polymers, methacrylic acid ester-based polymers, polycarbonate, and cellulose triacetate.

2. The decorative sheet according to claim 1, wherein the arithmetic average roughness (Ra0.08) measured on the surface side of the surface-protecting layer at a cutoff value of 0.08 mm with an evaluation length of 0.4 mm by a measurement method in accordance with JIS B0601:2001 is 0.50 µm or more.

3. The decorative sheet according to claim 2, wherein the specular glossiness on the surface-protecting layer side of the decorative sheet at an incident angle of 60° is 14 or less.

4. The decorative sheet according to claim 2, wherein the inorganic filler content is 0.5 parts by mass or more and 30 parts by mass or less, based on 100 parts by mass of resins that constitute the surface-protecting layer.

5. The decorative sheet according to claim 2, wherein the resins that constitute the surface-protecting layer comprise an ionizing radiation-curable resin.

6. A decorative plate having the decorative sheet according to claim 2 on an adherend.

7. The decorative sheet according to claim 1, wherein the specular glossiness on the surface-protecting layer side of the decorative sheet at an incident angle of 60° is 14 or less.

8. The decorative sheet according to claim 1, wherein the inorganic filler content is 0.5 parts by mass or more and 30 parts by mass or less, based on 100 parts by mass of resins that constitute the surface-protecting layer.

9. The decorative sheet according to claim 1, wherein the inorganic filler is silica.

10. The decorative sheet according to claim 1, wherein the resins that constitute the surface-protecting layer comprise an ionizing radiation-curable resin.

11. A decorative plate having the decorative sheet according to claim 1 on an adherend.

12. The decorative sheet according to claim 1, further comprising a primer layer between the transparent resin layer and the surface-protecting layer.

13. The decorative sheet according to claim 1, wherein the decorative sheet is embossed on the uppermost surface layer side.

* * * * *